(12) United States Patent
Suetomo et al.

(10) Patent No.: US 7,031,240 B2
(45) Date of Patent: *Apr. 18, 2006

(54) DISC DRIVE DEVICE

(75) Inventors: Toru Suetomo, Higashihiroshima (JP);
Masahiro Kawasaki, Hiroshima (JP);
Masayuki Imada, Hiroshima (JP);
Yoichi Yamamoto, Hiroshima (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/829,239

(22) Filed: Apr. 22, 2004

(65) Prior Publication Data

US 2004/0196761 A1    Oct. 7, 2004

Related U.S. Application Data

(62) Division of application No. 10/157,115, filed on May 30, 2002, now Pat. No. 6,747,927.

(30) Foreign Application Priority Data

May 31, 2001    (JP) ............................ 2001-164468

(51) Int. Cl.
*G11B 5/09* (2006.01)
(52) U.S. Cl. ................ 369/47.38; 369/47.41; 369/47.46; 369/59.1
(58) Field of Classification Search ................ None
See application file for complete search history.

(56) References Cited

U.S. PATENT DOCUMENTS

| 5,953,300 | A | 9/1999 | Serizawa et al. |
| 6,480,666 | B1 | 11/2002 | Wilson et al. |
| 6,747,927 | B1 * | 6/2004 | Suetomo et al. ......... 369/47.38 |

FOREIGN PATENT DOCUMENTS

| JP | 4-003369 | 1/1992 |
| JP | 4-252470 | 9/1992 |
| JP | 2570004 | 10/1996 |
| JP | 2000-113573 | 4/2000 |
| JP | 2001-084689 | 3/2001 |

* cited by examiner

*Primary Examiner*—Muhammad Edun
(74) *Attorney, Agent, or Firm*—Wenderoth, Lind & Ponack, L.L.P.

(57) ABSTRACT

A disc drive device optimally controls a speed for reading RTR-format data, such as video and audio, recorded on a DVD-format disc, thereby enabling real-time playback without interruption. In the disc drive device, information added to each sector is used for determining whether data is RTR-format data. When an error occurs at high-speed reading of RTR-format data and therefore the reading speed is changed to a low speed, the reading speed is so controlled as to be kept at the low speed for reading the following RTR-format data. Thus, for RTR-format data, overhead due to repetitive acceleration and deceleration processes can be avoided, and reading can be carried out without interfering with real-time playback. For normal data, reading can be carried out in a manner similar to that in the background art.

41 Claims, 12 Drawing Sheets

FIG. 12

PARAMETERS OF ATAPI READ12 COMMAND

| Bit<br>Byte | 7 | 6 | 5 | 4 | 3 | 2 | 1 | 0 |
|---|---|---|---|---|---|---|---|---|
| 0 | CODE VALUE REPRESENTING READ REQUEST ||||||||
| 1 | |||||||| 
| 2 | HEAD ADDRESS OF DATA TO BE READ ||||||||
| 3 | ||||||||
| 4 | ||||||||
| 5 | ||||||||
| 6 | LENGTH OF DATA TO BE READ ||||||||
| 7 | ||||||||
| 8 | ||||||||
| 9 | ||||||||
| 10 | STREAMING BIT | RESERVED AREA |||||||
| 11 | ||||||||

DISC DRIVE DEVICE

This application is a divisional application of Ser. No. 10/157,115, filed May 30, 2002 now U.S. Pat. No. 6,747,927.

BACKGROUND OF THE INVENTION

1. Field of the Invention

The present invention relates to disc drive devices and, more specifically, a device incorporated in a DVD player, a DVD recorder, a personal computer, or the like, and capable of driving discs in DVD format (DVD-ROM discs, DVD-RAM discs, DVD-R discs, DVD-RW discs, etc.) for reading (reproducing) data on a real-time basis, such as video and audio, recorded on the DVD-format discs.

2. Description of the Background Art

As is well known, DVD-format discs have such a large storage capacity that they are used mainly for recording and reproducing data on a real-time basis. Data, such as video and audio, that should be recorded and reproduced on a real-time basis is hereinafter called Real-time data. Especially, in writable DVD-format discs, such as DVD-RAM, DVD-R, and DVD-RW discs, a real-time recording (RTR) format is used for recording Real-time data. In the RTR format, Real-time data is compressed with MPEG2 at a compression rate enabling single-speed recording, and then is recorded on a disc. Therefore, the Real-time data recorded in the RTR format (hereinafter, "RTR-format data") is generally reproduced at single speed (normal speed) in a disc drive device.

Unlike magnetic tapes, discs (especially, optical discs where data can be recorded or reproduced without any contact) have a feature of enabling a quick change of data locations to be read. Using this feature, one conventional scheme is to read data at a speed equal to or faster than single speed, and then sequentially store the read data in memory of the device before reproduction. In this scheme, if data fails to be read due to a scratch or stain on the disc or vibrations of the device (if a read error occurs), such data can be read again while other data stored in memory is being reproduced. In recent years, technology has been so advanced as to enable CD-ROM drives to carry out data processing at 32× to 48× speeds and DVD-ROM drives to carry out at 8× to 16× speeds.

In general, disc drive devices capable of high-speed reading at single or more speed are also capable of low-speed reading. For example, disc drive devices capable of reading DVD-ROM discs at 8× speed at maximum are often capable of reading at quadruple speed and also at double speed. Note that which speeds are supported by a particular disc drive device depend on its vender.

An example technique using the above feature of supporting a plurality of speeds is disclosed in Japanese Patent No. 2570004, in which the reading speed is varied between Real-time data and program data in order to improve efficiency of reading and executing data that does not have to be read or executed on a real-time basis.

In general, data recorded on a disc is more likely to be successfully read at a low speed, compared with when read at a high speed. Therefore, if an error has occurred during high-speed data reading, the data is generally tried to be re-read at the high speed for several times. If an error still occurs, the data is then tried to be read at the low speed. If a plurality of speeds are supported, the reading speed is changed stepwise within the supported speeds, such as from 8× speed, quadruple speed, double speed, and then to single speed.

Here, if the reading speed is changed to the low speed due to the occurrence of an error, and kept thereat for data reading, data reading has to be carried out always at the low speed even in a case where any further errors will not possibly occur. Such low-speed reading is a waste of time. Therefore, in general, after being changed to the low speed due to the occurrence of an error, the reading speed is returned to the high speed in such a case as after data reading has been carried out for a predetermined number of sectors; after a predetermined time passes; when data reading is carried out for a sector away from the one where the error has occurred, or others.

However, to re-read data after an error has been detected, it takes several tens to hundreds of milliseconds (seek time). Moreover, a process for decelerating or accelerating the reading speed can take several hundreds to thousands of milliseconds at a time. Therefore, such processing time greatly interferes with reproduction of Real-time data, such as RTR-format data. Especially, as for a disc that is error-prone at high-speed reading, if the reading speed is decelerated or accelerated every time when an error occurs with a sufficient amount of data not yet been stored in memory, video and audio recorded on the disc cannot be played back without interruption because data cannot be read during the deceleration or acceleration process.

SUMMARY OF THE INVENTION

Therefore, an object of the present invention is to provide a disc drive device that optimally controls a speed for reading RTR-format data, such as video and audio, recorded on a DVD-format disc, thereby enabling real-time playback without interruption.

The present invention has the following features to attain the object mentioned above.

A first aspect of the present invention is directed to a disc drive device supporting at least two types of reading speeds, a high speed and a low speed, capable of driving a DVD-format disc, reading data from the disc by following a read instruction from a host section, and sending the read data to the host section. The disc drive device includes: a processing section operable to read, from the disc at one of the reading speeds, the data corresponding to the read instruction and additional information related to the data; a determining section operable to determine, based on the additional information, whether the read data is Real-time data; a storage section operable to temporarily store the read data; and a sending section operable to send the data stored in the storage section to the host section in predetermined playback timing. When the reading speed is currently the low speed, the processing section keeps the reading speed while the determining section determines that the read data is the Real-time data.

Here, when the reading speed is currently the high speed, the processing section changes the reading speed to the low speed when the determining section determines, successively for a predetermined number of times, that the read data is the Real-time data; when a data read error occurs; or after a data read error occurs and then a predetermined condition is satisfied.

At this time, the predetermined condition is preferably whether data reading has been carried out for a predetermined number of times, or for a predetermined period.

Moreover, when the reading speed is currently the low speed, the processing section changes the reading speed to the high speed when the determining section determines that the read data is not the Real-time data and when a predetermined condition is satisfied. Here, when the disc is a DVD-RAM disc and the reading speed is currently the low speed, the processing section may change, under a predetermined condition, the reading speed to the high speed while a reading head is passing through a gap specified in DVD-RAM specifications even though the determining section determines that the read data is the Real-time data.

At this time, the predetermined condition is preferably whether data reading has been successfully carried out for a predetermined number of times or for a predetermined period after a data read error was cleared.

Still further, the additional information is a recording type bit recorded on a header of a sector that stores the data.

As described above, in the first aspect, the information added to the sector is used for determining whether the data is the one recorded on a real-time basis (RTR-format data). When an error occurs at high-speed reading of RTR-format data and therefore the reading speed is changed to the low speed, the reading speed is so controlled as to be kept at the low speed for reading the following RTR-format data. Thus, for RTR-format data, overhead due to repetitive acceleration and deceleration processes can be avoided, and reading can be carried out without interfering with real-time playback. For normal data, reading can be carried out in a manner similar to that in background art. Furthermore, the process for accelerating the reading speed of RTR-format data is carried out while the reading head is passing over the GAP. Thus, even though once changed to the low speed, the reading speed can be back to the high speed without interfering with real-time playback.

A second aspect of the present invention is directed to a disc drive device supporting at least two types of reading speeds, a high speed and a low speed, capable of driving a DVD-format disc, reading data from the disc by following a read instruction from a host section, and sending the read data to the host section. The disc drive device includes: a determining section operable to determine whether the disc has Real-time data thereon based on specific information stored on the disc; a managing section operable to set a flag indicating whether the Real-time data exists based on a determination result from the determining section; a processing section operable to read, from the disc at one of the reading speeds, the data corresponding to the read instruction; a storage section operable to temporarily store the read data; and a sending section operable to send the data stored in the storage section to the host section in predetermined playback timing. The managing section sets the flag when the determining section determines that the disc has the Real-time data thereon. When the reading speed is currently the low speed, the processing section keeps the reading speed while the flag is set.

Here, when the reading speed is currently the high speed, the processing section changes the reading speed to the low speed when the determining section determines, successively for a predetermined number of times, that the read data is the Real-time data; when a data read error occurs; or speed when a data read error occurs and then a predetermined condition is satisfied.

At this time, the predetermined condition is preferably whether data reading has been carried out for a predetermined number of times or a predetermined period.

Still further, when the reading speed is currently the low speed, the processing section changes the reading speed to the high speed when the flag is not set and a predetermined condition is satisfied. Here, when the disc is a DVD-RAM disc and the reading speed is currently the low speed, the processing section may change, under a predetermined condition, the reading speed to the high speed while a reading head is passing through a gap specified by DVD-RAM specifications, even though the flag is set.

At this time, the predetermined condition is preferably whether data reading has been successfully carried out for a predetermined number of times or for a predetermined period after a data read error was cleared.

Still further, it will be more expedient to achieve the second aspect if information representing whether an SLR bit recorded on a read-in area of the disc indicates 1 or information representing whether a DVD_RTAV directory specified by the UDF format exists on the disc is used as the specific information.

As described above, in the second aspect, by using the information recorded on the read-in area or the information specified by the UDF format, it is determined whether the disc has data recorded on a real-time basis (RTR-format data). When an error occurs at high-speed reading of RTR-format data and therefore the reading speed is changed to the low speed, the reading speed is so controlled as to be kept at the low speed for reading the following RTR-format data. Thus, for RTR-format data with SLR information and a DVD_RTAV directory, overhead due to repetitive acceleration and deceleration processes can be avoided, and reading can be carried out without interfering with real-time playback. For normal data, reading can be carried out in a manner similar to that in background art. Furthermore, the process for accelerating the reading speed of RTR-format data is carried out while the reading head is passing over the GAP. Thus, even though once changed to the low speed, the reading speed can be back to the high speed without interfering with real-time playback.

Alternatively, the managing section may manage a plurality of flags according to the reading speeds, and can individually set the plurality of flags so that at least one of the reading speeds is not changed when the determining section determines that the disc has the Real-time data thereon.

As such, a plurality of flags are provided correspondingly to a plurality of drivable speeds. Thus, it is possible to carry out the process of accelerating the reading speed stepwise from the low speed to an optimal speed at which real-time playback is not interfered with.

A third aspect of the present invention is directed to a disc drive device supporting at least two types of reading speeds, a high speed and a low speed, capable of driving a DVD-format disc, reading data from the disc by following a read instruction from a host section, and sending the read data to the host section. The disc drive device includes: an extracting section operable to extract, from the read instruction coming from the host section, information indicating whether real-time playback is carried out; a processing section operable to read, based on the extracted information, and from the disc at one of the reading speeds, the data corresponding to the read instruction; a storage section operable to temporarily store the read data; and a sending section operable to send the data stored in the storage section to the host section in predetermined playback timing. When the reading speed is currently the low speed, the processing section keeps the reading speed while the information indicates real-time playback.

Here, when the reading speed is currently the high speed, the processing section changes the reading speed to the low speed when the information indicating real-time playback comes successively for a predetermined number of times; when a data read error occurs; or when a data read error occurs and then a predetermined condition is satisfied.

At this time, the predetermined condition is whether data reading has been carried out for a predetermined number of times, or for a predetermined period.

Still further, when the reading speed is currently the low speed, the processing section changes the reading speed to the high speed when the information does not indicate that the real-time playback is to be carried out and a predetermined condition is satisfied. Here, when the disc is a DVD-RAM disc and the reading speed is currently the low speed, the processing section may change, under a predetermined condition, the reading speed to the high speed while a reading head is passing through a gap specified by DVD-RAM specifications, even though the information indicates that the real-time playback is to be carried out.

At this time, the predetermined condition is preferably whether data reading has been successfully carried out for a predetermined number of times or for a predetermined period after a data read error was cleared.

Also, when an interface to the host section is ATAPI, it will be more expedient to achieve the third aspect if a streaming bit of a READ12 command is used as the information indicating whether the real-time playback is to be carried out.

As described above, in the third aspect, not the disc drive device but the host device can assume the main role of controlling RTR-format data reading.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is an illustration showing parameters of a READ12 command in ATAPI.

DESCRIPTION OF THE PREFERRED EMBODIMENTS

Described below is the present invention exemplarily taking a disc drive device capable of playing back, at either of double speed (high speed) and single speed (low speed), a DVD-RAM format disc having RTR-format data recorded thereon.

Figure 1:
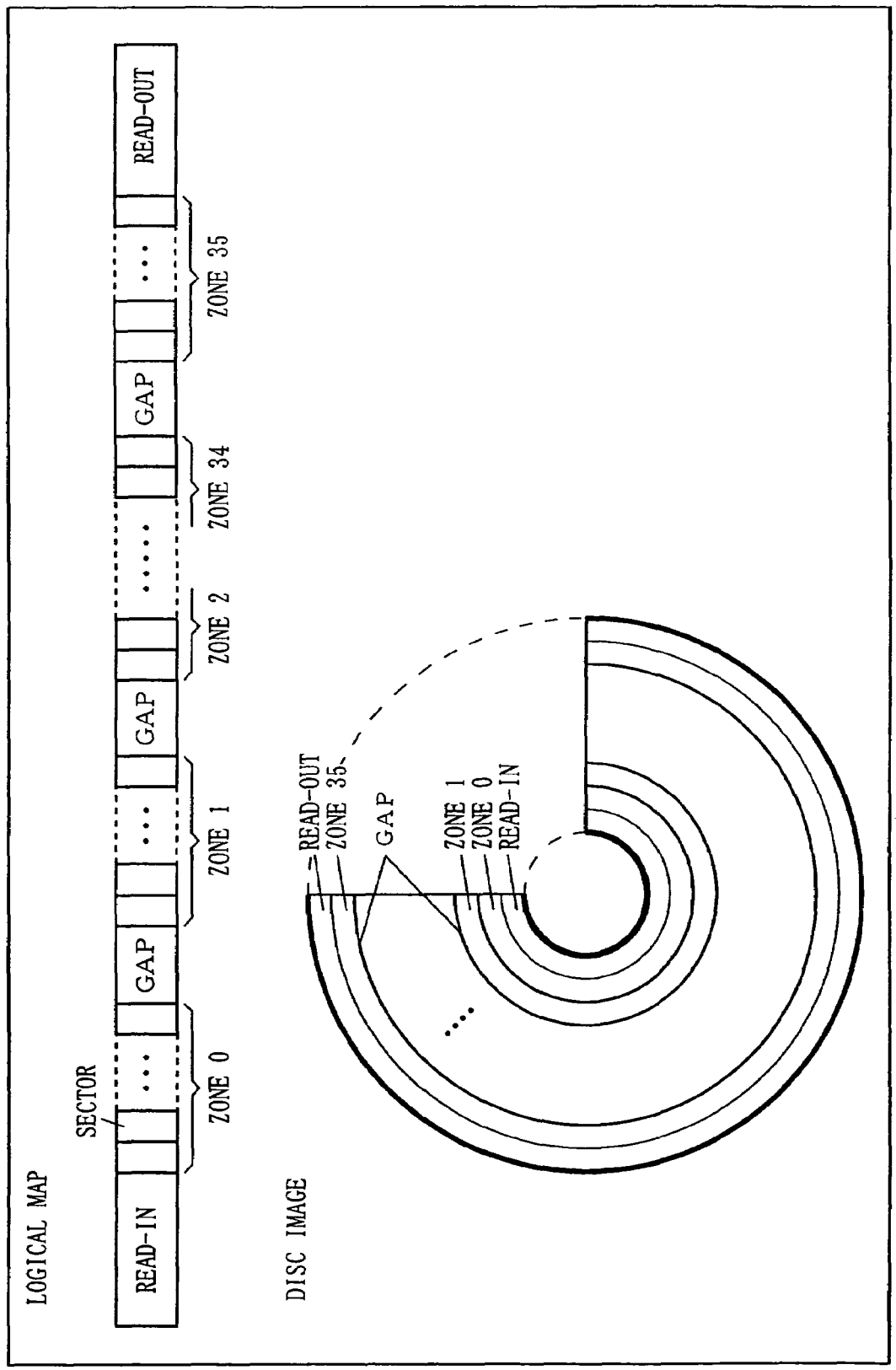
FIG. 1 is an illustration describing a recording format of a DVD-RAM disc.
Figure 2:
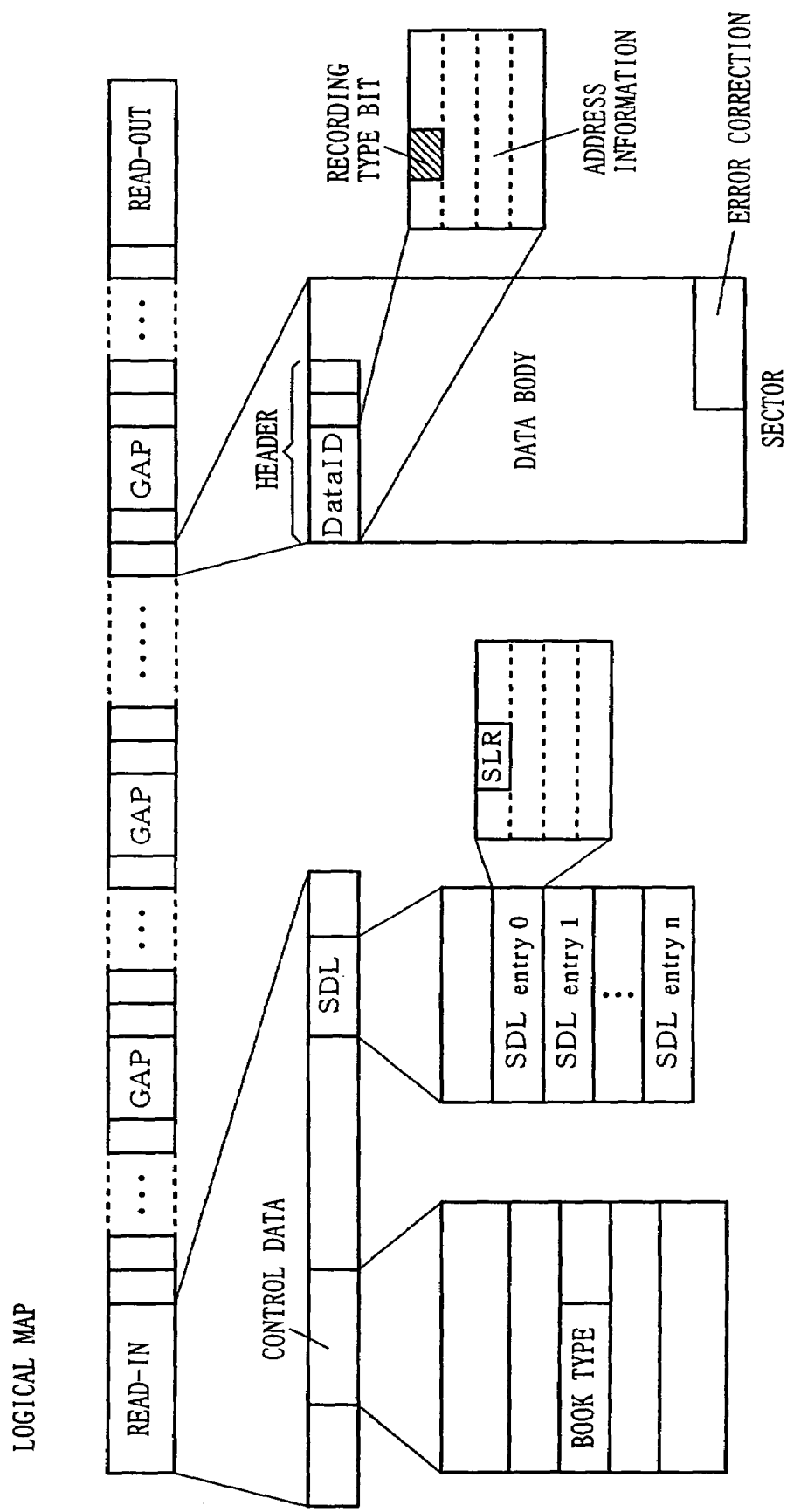
FIG. 2 is an illustration describing the structure of data in areas related to the present invention illustrated in FIG. 1.

Prior to embodiments according to the present invention, a DVD-RAM recording format is briefly described. FIG. 1 is an illustration demonstrating a recording format of a DVD-RAM disc. FIG. 2 is an illustration describing the structure of data in areas related to the present invention in FIG. 1.

In FIG. 1, provided at the most inner radius of a disc is a read-in area, and provided at the most outer radius thereof is a read-out area. Areas other than the read-in area and the read-out area are data areas. Each data area has data recorded therein as being divided into sectors. The sectors are managed in units of zone predetermined in DVD-RAM format. Provided between zones is a predetermined gap (GAP).

With reference to FIG. 2, the read-in area has a control data area, a secondary defective list (SDL) area, and other areas. In the control data area, a book type is previously recorded, indicating of which type of DVD format the disc is. By way of example only, if the disc is a DVD-ROM disc, the control data area has "0000b" recorded therein. Also by way of example only, if the disc is a DVD-RAM disc, the control data area has "0001b" recorded therein. In the SDL area, information about any defective block (=16 sectors) found at the time of data recording is recorded. The SDL area is the one contained only in DVD-RAM discs. If the disc has data other than RTR-format data (such other data is hereinafter referred to normal data) recorded thereon, the SDL area stores an address of a defective block where data cannot be recorded, and an address of an alternative block having the data alternatively recorded thereon. If the disc has RTR-format data recorded thereon, on the other hand, the SDL area stores only the address of the defective block, and an SLR (Status of Linear Replacement) bit is set to "1".

In FIG. 2, the information stored in the SDL area is located only at an area in the read-in area. In practice, however, the DVD-RAM disc has another SDL area located in the read-in area and two SDL areas located in the read-out area for redundantly storing the same information. This redundancy enables recording and playback of the entire disc even in a case where any one of the SDL areas cannot be accessed due to a scratch on the disc, etc.

Each sector is composed of a header area for storing information about the recorded data, a data area for recording the data body, and an error correction area. The header area has a data ID including a recording type bit indicative of a recording format of the data recorded on the data area. The recording type bit is set to "1" if RTR-format data is recorded, and to "0" if normal data is recorded.

Described next are disc drive devices according to the embodiments of the present invention, those capable of playing back various discs (CD-ROM discs, for example) as well as DVD-RAM discs in the above-described recording format.

First Embodiment

Figure 3:
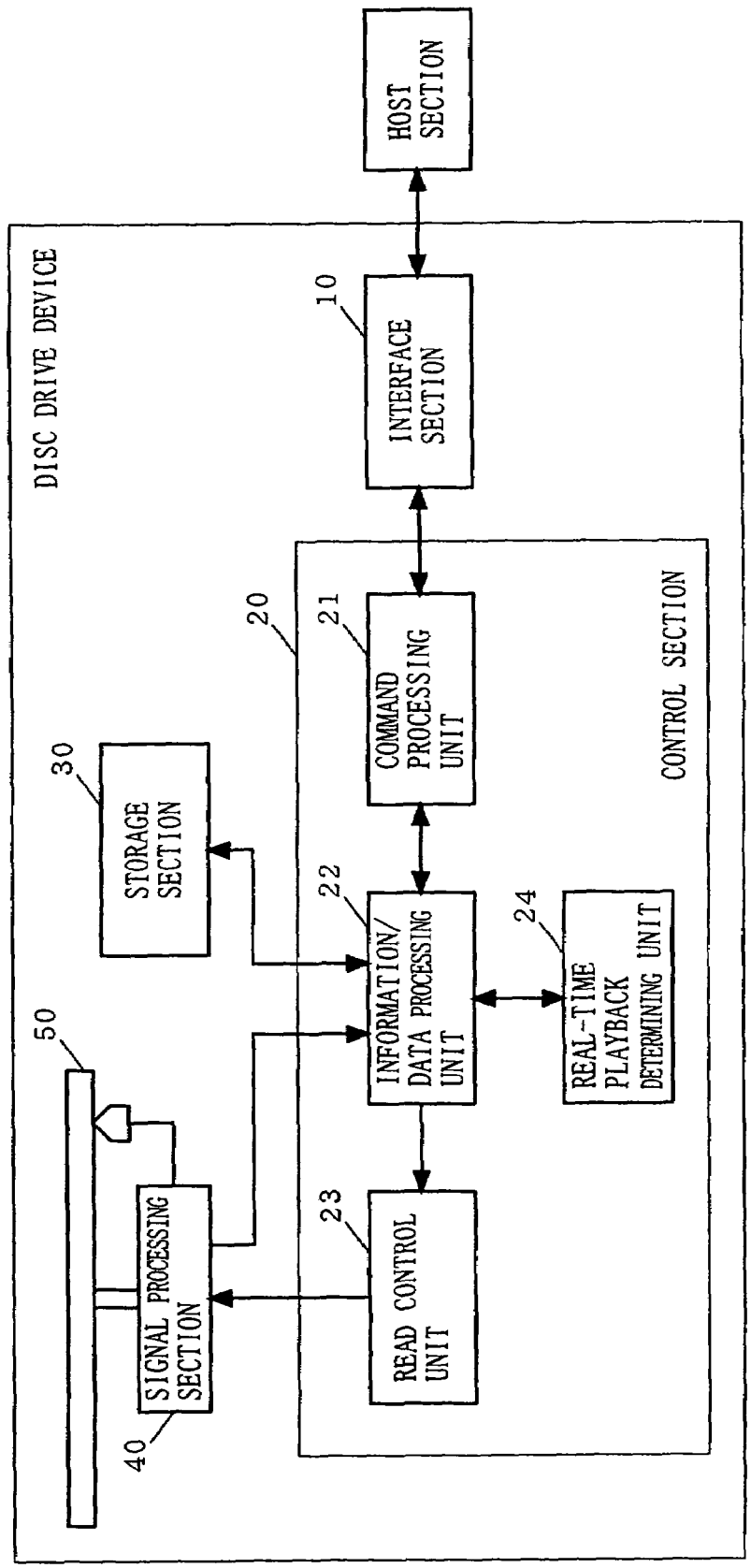
FIG. 3 is a block diagram illustrating the construction of a disc drive device according to a first embodiment of the present invention.
Figure 4:
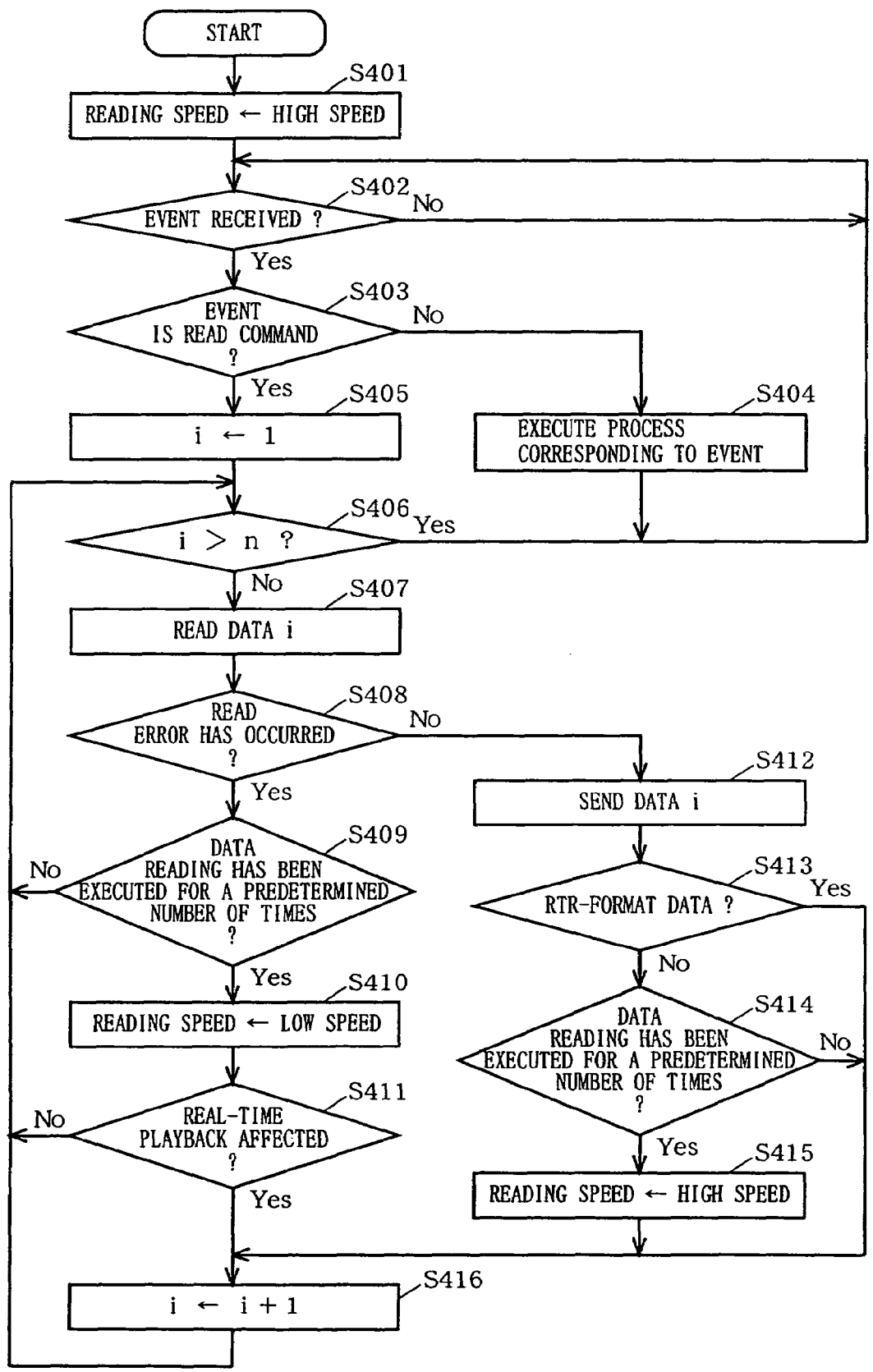
FIG. 4 is a flowchart showing the procedure of data reading carried out by the disc drive device according to the first embodiment of the present invention.
Figure 5:
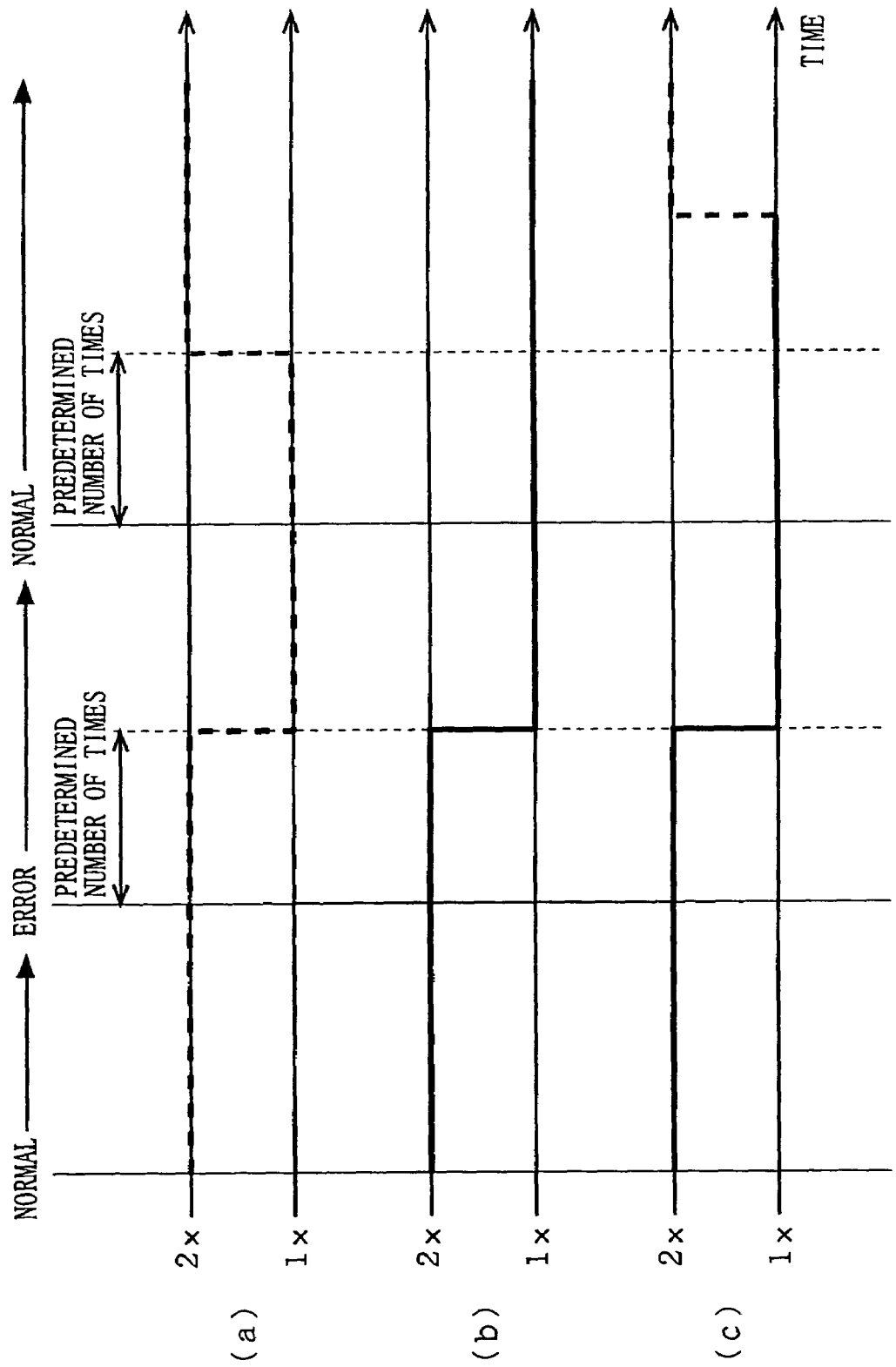
FIG. 5 is an illustration visually representing one example of changes in data reading speed based on the flowchart of FIG. 4.
Figure 6:
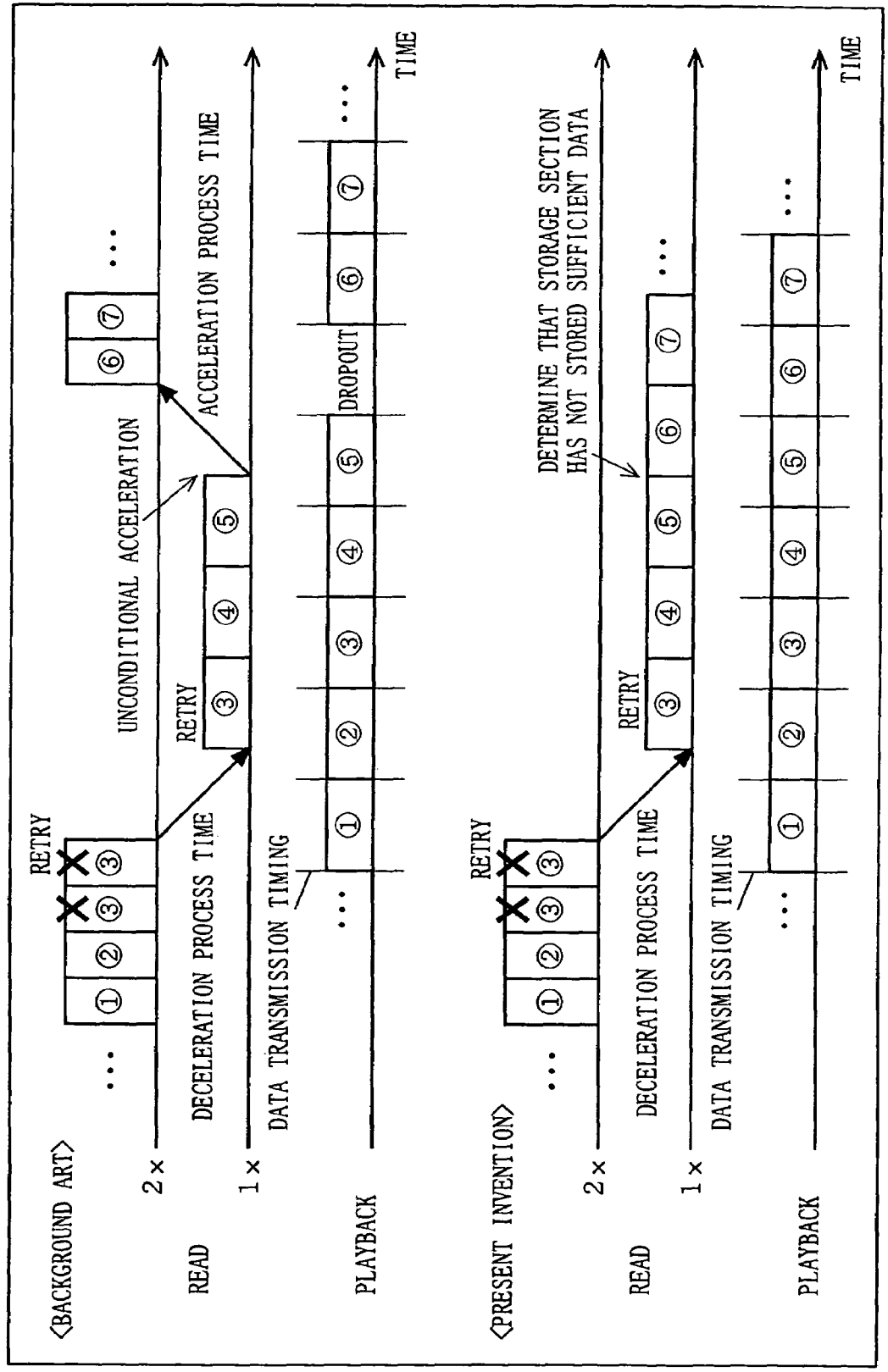
FIG. 6 is an illustration demonstrating problems in data reading according to background art.

FIG. 3 is a block diagram illustrating the construction of a disc drive device according to a first embodiment of the present invention. FIG. 4 is a flowchart showing the procedure of data reading carried out by the disc drive device according to the first embodiment of the present invention. FIG. 5 is an illustration visually representing one example of changes in data reading speed based on the flowchart of FIG. 4. FIG. 6 is an illustration for demonstrating problems in data reading in background art.

In FIG. 3, the disc drive device according to the first embodiment includes an interface section 10, a control section 20, a storage section 30, and a signal processing section 40. The control section 20 includes a command processing unit 21, an information/data processing unit 22, a reading control unit 23, and a real-time playback determining unit 24.

With reference to FIG. 3, described first are the general outlines of components of the disc drive device according to the first embodiment.

The interface section 10 connects a host section for providing instructions for data reproduction and the control section 20 to each other. The command processing unit 21 receives a command for reading data to be reproduced on a disc 50 from the host section through the interface section 10. The command processing unit 21 interprets the received command, and then gives a read instruction to the information/data processing unit 22. Also, the command processing unit 21 sends, through the interface section 10 to the host section, the data read based on the command transferred from the information/data processing unit 22. The information/data processing unit 22 follows an instruction from the command processing unit 21, sending, to the reading control unit 23, an instruction for reading data and an instruction as to a reading speed. The information/data processing unit 22 receives the data and its additional information read by the signal processing section 40 from the relevant sector on the disc 50, and outputs the data to the command processing unit 21 and the additional information to the real-time playback determining unit 24. The information/data processing unit 22 writes, as required, the read data in the storage section 30. If the data to be read based on the instruction given by the command processing unit 21 has been written in the storage section 30, the information/data processing unit 22 reads the data from the storage section 30, and transfers it to the command processing unit 21.

The read control unit 23 controls the signal processing section 40 based on the instruction from the information/data processing unit 22 so that the relevant data is read at the speed as instructed. In response to the control by the read control unit 23, the signal processing section 40 reads the data and the additional information from the relevant sector on the disc 50. Based on the additional information received from the information/data processing unit 22, the real-time playback determining unit 24 determines through a predetermined determination scheme whether the data read from the disc 50 is RTR-format data or normal data, and sends an instruction as to the reading speed to the information/data processing unit 22.

With reference to FIG. 4, described next is data reading carried out by the disc drive device according to the first embodiment. Note that, in FIG. 4, described is an example case where the host section issues a read command for reading data 1 to n (n is an arbitrary integer).

The disc drive device starts data reading when powered on or when the disc 50 is set in the device. Then, the control section 20 initializes the data reading speed to a high speed (step S401). When an event is received (step S402), the control section 20 determines whether the event is a read command issued from the host section for requesting data reading, and carries out processing that corresponds to the type of event (steps S403 to S416). If the event is a read command (Yes in step S403), the control section 20 instructs the signal processing section 40 to read the head of the data requested by the read command at the high speed (steps S405, S407). The control section 20 then determines whether any error has occurred in data reading (step S408)

When no error has occurred (No in step S408), the control section 20 stores, as required, the read data in the storage section 30, and also sends to the host section the read data in predetermined timing (step S412). The control section 20 then determines, based on the additional information read together with the data, whether the read data is RTR-format data (step S413). Here, an example of the additional information on which determination is based is the above-described recording type bit. In this case, if the recording type bit indicates "1", the read data is determined as RTR-format data. If the read data is normal data, the control section 20 determines whether the number of times of low-speed reading that has been continuously carried out after the occurrence of the previous read error exceeds a predetermined number of times (step S414). If the number of times of low-speed reading exceeds the predetermined number of times, the control section 20 changes the data reading speed back to the high speed (step S415).

After the above data reading has been completed, the control section 20 goes to the next data reading (step S416)

If a read error has occurred (Yes in step S408), the control section 20 determines whether the same data has been read for a predetermined number of times (step S409). If the same data has not yet been read repeatedly for the predetermined number of times, the control section 20 executes re-reading at the high-speed. If the same data has been read for the predetermined number of times, the control section 20 executes re-reading at the low speed (steps S409, S410). At this time, if a read error occurs after re-reading has been executed at the low speed several number of times, the control section 20 gives up reading the current data, and moves to a process of reading the next data in order to maintain Real-time data transfer to the host section (steps S411, S416).

The reading process in steps S406 to S415 is repeatedly executed for all data requested by the read command.

Note that, in the above steps S409 and S414, instead of the number of times, a criterion for determination may be a period during which no read command come from the host section, or whether a predetermined amount or more of data (reproducible on a real-time basis during the acceleration process) has been stored in the storage section 30. Furthermore, the criterion may be whether a sector to be read next is located away from the sector read this time (where a seek time occurs). These criteria can be arbitrarily combined.

Moreover, as stated above, the deceleration and acceleration processes require a predetermined amount of time. During that time, data reading cannot be made. Therefore, the deceleration and acceleration processes are preferably carried out during a period not related to data reading. That is, the deceleration and acceleration processes are preferably made while a reading head is passing over the GAP. To achieve this, when it is determined in steps S407 and S412 the data reading has been carried out for the predetermined number of times, the deceleration and acceleration processes are not started until the reading head comes to the head position of the GAP. Whether the reading head has come to the head position of the GAP can be easily determined by determining, based on an address uniquely provided to each sector, whether the data in the last sector of the zone has been read.

With reference to FIG. 5, plainly described are changes in data reading speed. In FIG. 5, bold solid lines denote that data to be read is RTR-format data, while broken lines denote that data to be read is normal data. Furthermore, "2×" denotes double-speed (high-speed) reading, while "1×" denotes single-speed (low-speed) reading.

In FIG. 5, (a) illustrates a case where data to be read is normal data. In this case, even if the reading speed is changed to the low speed after the occurrence of a read error, the reading speed is back to the high speed if no error has occurred anymore and then low-speed reading has been executed for the predetermined number of times. Also in FIG. 5, (b) illustrates a case where data to be read is RTR-format data. In this case, once the reading speed is changed to the low speed after the occurrence of a read error, the reading speed is never back to the high speed even if no error has occurred anymore. Also in FIG. 5, (c) illustrates a case where data to be read includes a mixture of RTR-format data and normal data. In this case, if the RTR-format data continues to be read after reading is executed for the predetermined number of times after the occurrence of an error, the reading speed is kept at the low speed until normal data is read. Then, once the reading speed is back to the high speed, data reading is executed at the high speed irrespectively of data type, until another read error occurs.

FIG. 6 is an illustration for demonstrating a difference between the present invention and the background art when a criterion used in step S414 for determining whether to carry out the acceleration process is whether a predetermined amount of data has been stored in the storage section 30. As clear from the drawing, in background art, the acceleration process is unconditionally carried out for the RTR-format data as well as the normal data. Therefore, data may not always be reproduced on a real-time basis unless a sufficient amount of data has been stored in the storage section 30. On the contrary, in the present invention, the above problem does not occur because the acceleration process is not carried out unless a sufficient amount of RTR-format data has been stored in the storage section 30.

As such, in the disc drive device according to the first embodiment of the present invention, the information added to the sector is used for determining whether the data is the one recorded in RTR format. When an error occurs at high-speed reading of RTR-format data and therefore the reading speed is changed to the low speed, the reading speed is so controlled as to be kept at the low speed for reading the following RTR-format data. Thus, for RTR-format data, overhead due to repetitive acceleration and deceleration processes can be avoided, and reading can be carried out without interfering with real-time playback. For normal data, reading can be carried out in a manner similar to that in background art.

In the first embodiment, when an error occurs during data reading, high-speed reading is carried out for the predetermined number of times (step S407). Alternatively, low-speed reading may be carried out immediately after the occurrence of an error. Still alternatively, such low-speed reading may be carried out only in a case where the data to be read is RTR-format data. For controlling the above-described reading, it is required to obtain the recording type bit of the sector where the read error has occurred. If such recording type bit cannot be obtained, a recording type bit of a sector preceding to the one where the read error has occurred is previously stored for use in controlling the reading.

Furthermore, in the first embodiment, when an error occurs in data reading, the data is read again. Alternatively, the data that failed to be read may not be read again, but data subsequent thereto may be read at the low speed immediately after the error occurs.

Still further, in the first embodiment, the reading speed is changed to the low speed while the data that failed to be read is being read again (step S410). Alternatively, the reading speed may be changed to the low speed after the data that failed to be read has been successfully read and then data subsequent thereto has been read for a predetermined number of times. In this case, the predetermined number of times is set to be the number of consecutive pieces of RTR-format data. Still alternatively, the reading speed may be changed to the low speed after the storage section 30 has stored an amount of data that can be transferred without interruption to the host section during the deceleration process.

Still further, in the first embodiment, for normal data, the reading speed is changed to the low speed after a read error occurs, and then is back to the high speed after reading got back to normal and then has been carried out for the predetermined number of times. Alternatively, the reading speed may be back to the high speed immediately after reading gets back to normal.

Still further, in the first embodiment, the additional information is always used at the time of data reading. Alternatively, the additional information may be used only during a period from the time when a read error occurs to the time when the reading speed is back to the high speed (step S415).

Second Embodiment

In the first embodiment, for controlling the reading speed, the data type is determined based on the information stored in the sector when the data is actually read. Described in a second embodiment is a scheme for easily controlling the reading speed by using a flag set based on disc's read-in information, which can be referred to when the device is powered on or a disc is inserted therein.

Figure 7:
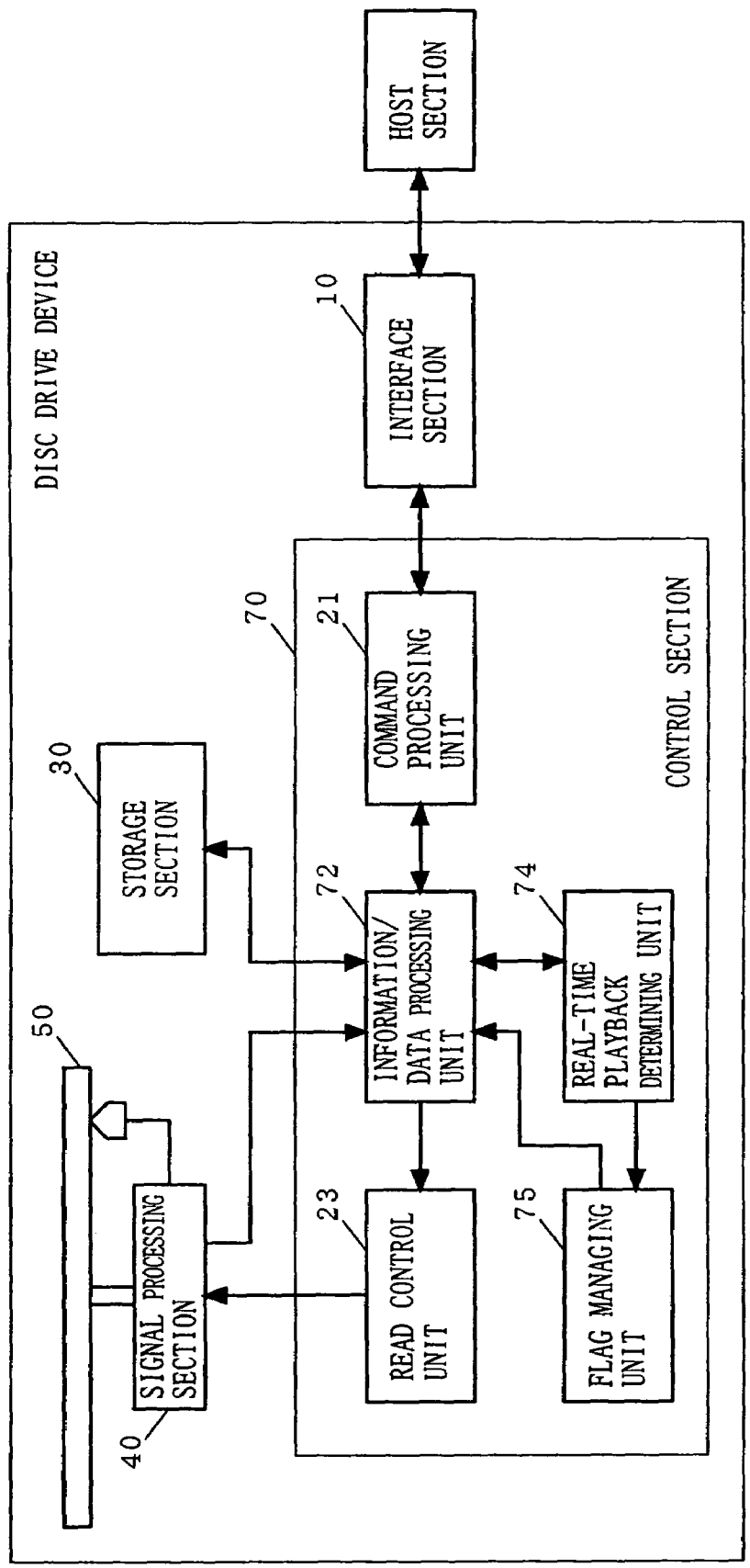
FIG. 7 is a block diagram illustrating the construction of a disc drive device according to a second embodiment of the present invention.
Figure 8:
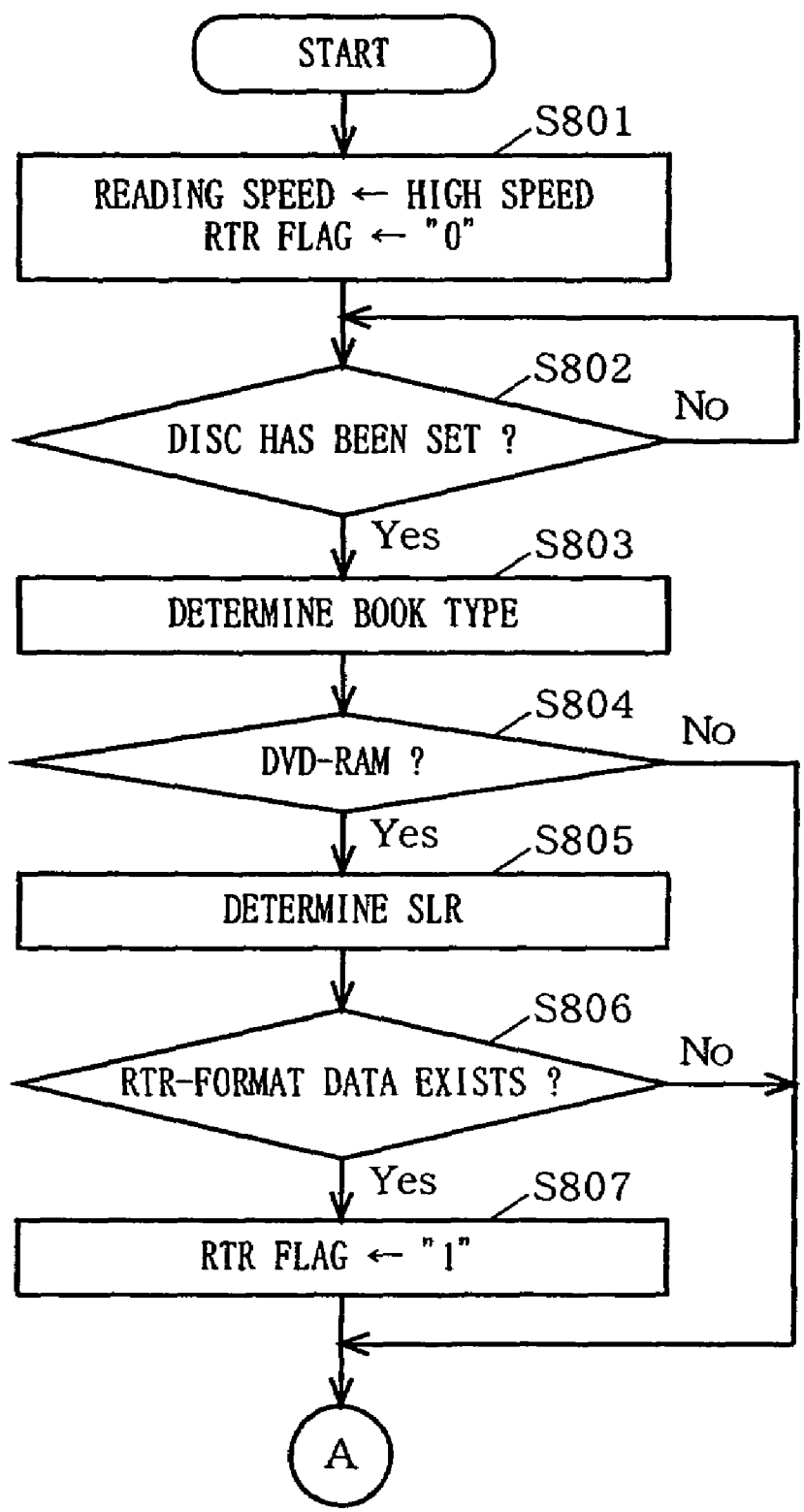
FIG. 8 is a flowchart showing a first-half of the procedure of data reading carried out by the disc drive device according to the second embodiment of the present invention.
Figure 9:
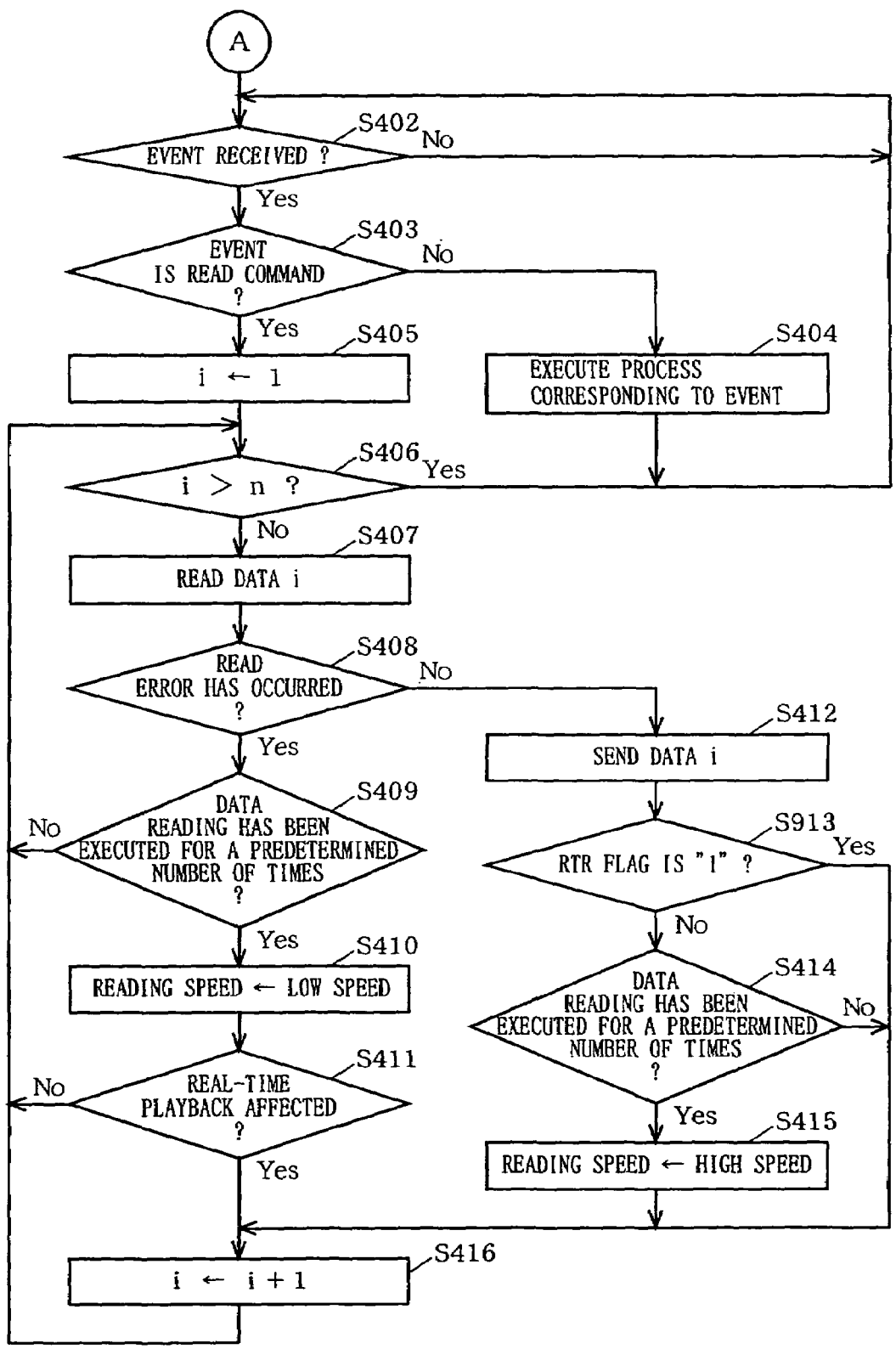
FIG. 9 is a flowchart showing a second-half of the procedure of data reading carried out by the disc drive device according to the second embodiment of the present invention.

FIG. 7 is a block diagram illustrating the construction of a disc drive device according to the second embodiment of the present invention. FIGS. 8 and 9 are flowcharts showing the procedure of data reading carried out by the disc drive device according to the second embodiment of the present invention.

In FIG. 7, the disc drive device according to the second embodiment includes the interface section 10, a control section 70, the storage section 30, and the signal processing section 40. The control section 70 includes the command processing unit 21, an information /data processing unit 72, the read controlling unit 23, a real-time playback determining unit 74, and a flag managing unit 75.

As evident from FIG. 7, the disc drive device according to the second embodiment is similar in construction to that according to the first embodiment, except that the information/data processing unit 22 and the real-time playback determining unit 24 of the control section 20 are replaced with the information/data processing unit 72 and the real-time playback determining unit 74, and that the flag managing unit 75 is newly added. Therefore, in the second embodiment, components similar to those in the first embodiment are provided with the same reference numerals, and not described herein.

With reference to FIG. 7, described first are the outlines of components of the disc drive device according to the second embodiment, mainly differences from the one according to the first embodiment.

The information/data processing unit 72 follows an instruction received from the command processing unit 21 or an RTR flag managed by the flag managing unit 75 to instruct the read controlling unit 23 to read the data or set the reading speed. Also, the information/data processing unit 72 receives data read by the signal processing section 40 from the relevant sector on the disc 50, a book type and an SLR recorded in the above-described read-in area. The information/data processing unit 72 then outputs the received data to the command processing unit 21, and the received book type and SLR to the real-time playback determining unit 74. Furthermore, the information/data processing unit 72 writes, as required, the read data in the storage section 30. If having already stored the data in the storage section 30 when receiving an instruction from the command processing unit 21, the information/data processing unit 72 reads the data from the storage section 30, and transfers it to the command processing unit 21. The real-time playback determining unit 74 determines, based on the book type and SLR received from the information/data processing unit 72, whether the disc 50 is a DVD-RAM disc and whether the disc 50 has recorded RTR-format data. Following a predetermined determination scheme, the information/data processing unit 72 gives an instruction as to the reading speed to the flag managing unit 75. The flag managing unit 75 manages the RTR flag that limits the reading speed for RTR-format data to set the RTR flag in accordance with an instruction from the real-time playback determining unit 74.

With reference to FIGS. 8 and 9, described is data reading carried out by the disc drive device according to the second embodiment. Note that, in FIG. 9, steps identical to those in FIG. 4 are provided with the same step numbers. In FIG. 8, the disc drive device starts data reading when powered on. Once the reading starts, the control section 70 initializes the data reading speed to a high speed, and initialized the RTR flag to "0" (step S801). The control section 70 then determines whether the disc 50 was set (or has been set) (step S802). If the disc 50 has been set, the control section 70 retrieves the book type recorded in the read-in area to determine whether the disc 50 is a DVD-RAM disc (steps S803, S804). If it is determined that the disc 50 is a DVD-RAM disc, the control section 70 retrieves the SLR recorded in the read-in area to further determine whether the disc 50 has RTR-format data recorded thereon (steps S805, S806). If it is determined that the disc 50 has RTR-format data recorded thereon, the control section 70 sets the RTR flag to "1" (step S807). On the other hand, if it is determined that the disc 50 is not a DVD-RAM disc or that the disc 50 has not recorded RTR-format data, the control section 70 waits to receive an event with the RTR flag kept at "0"s.

In FIG. 9, when an event is received (step S402), the control section 70 determines whether the event is a read command issued from the host section for requesting data reading, and carries out processing that corresponds to the type of the event (steps S403 through S416, S913). If the event is a read command (Yes in step S403), the control section 70 instructs the signal processing section 40 to read the head of the data requested by the read command at a high speed (steps S405, S407). The control section 70 then determines whether any error has occurred in data reading (step S408).

If no read error has occurred (No in step S408), the control section 70 stores, as required, the read data in the storage unit 30, and also sends the read data to the host section in predetermined timing (step S412). The control section 70 then checks the RTR flag managed by the flag managing unit 75 (step S913). If the RTR flag is "1", the control section 70 continues data reading at the current reading speed. If the RTR flag is "0", on the other hand, the control section 70 determines whether the number of times of low-speeding reading that has been continuously carried out after the occurrence of the previous read error exceeds a predetermined number of times (step S414). If the number of times of low-speed reading exceeds the predetermined number of times, the control section 70 changes the data reading speed back to the high speed (step S415).

After the above processing has been completed, the control section 70 moves to the next data reading (step S416).

If a read error has occurred (Yes in step S408), the control section 70 determines whether the same data has been repeatedly read for a predetermined number of times (step S409). If the same data has not yet been repeatedly read for the predetermined number of times, the control section 70 executes re-reading at the high speed. If the same data has been repeatedly read for the predetermined number of times, the control section 70 executes re-reading at the low speed (steps S409, S410). At this time, if a read error occurs even with repetitive re-reading at the low speed, the control section 70 gives up reading the current data, and moves to a process of reading the next data in order to maintain Real-time data transfer to the host section (steps S411, S416).

The reading process in steps S406 to S415 and S913 is repeatedly executed for all data requested by the read command. In steps S409 and S414, instead of the predetermined numbers of times, other criteria can be used, which has been described in the first embodiment. Also, changes in data reading speed are as illustrated in (a) and (b) of FIG. 5.

As such, according to the disc drive device according to the second embodiment of the present invention, the information recorded on the read-in area is used for determining whether the disc has RTR-format data recorded thereon. Also, for reading the RTR-format data, if an error occurs during high-speed reading and therefore the reading speed is changed to the low speed, data reading is so controlled as that the following RTR-format data is read still at the low speed. Thus, for RTR-format data with SLR information recorded thereon, overhead due to repetitive acceleration and deceleration processes can be avoided, and reading can be carried out without interfering with real-time playback. For normal data, reading can be carried out in a manner similar to that in background art.

In the second embodiment, even when the disc is determined at initialization to be a DVD-RAM disc having RTR-format data recorded thereon, the reading speed is kept at the high speed until an error occurs. Alternatively, the reading speed may be changed to the low speed when the disc is determined as such.

Furthermore, in the second embodiment, if an error occurs during data reading, high-speed reading is repetitively carried out for the predetermined number of times (step S409). Alternatively, low-speed reading may be carried out immediately after an error occurs.

Still further, in the second embodiment, the reading speed is changed to the low speed while data where a read error has occurred is being re-read (step S410). Alternatively, the reading speed may be changed to the low speed after the data where a read error has occurred has been successfully read and then the subsequent data reading has been carried out for a predetermined number of times. Still alternatively, the reading speed may be changed to the low speed after the storage section 30 has stored an amount of data that can be transferred without interruption to the host section during the deceleration process.

In the second embodiment, in a case where the RTR flag indicates "0", the reading speed is changed to the low speed after a read error occurs, and then is changed back to the high speed after normal reading has been carried out for a predetermined number of times. Alternatively, the reading speed may be changed immediately after the normal reading is started.

Third Embodiment

Described in the first and second embodiments are the control schemes in which the reading speed for RTR-format data is not changed once changed to the low speed, because the process of accelerating the reading speed takes so much time as to interfere with Real-time data reproduction.

In a third embodiment, although only for a DVD-RAM disc, the process of accelerating the reading speed is possible on condition that it is carried out during a period not related to data reading. With this, the reading speed of the RTR-format data can be changed back to the high speed under the predetermined condition.

To achieve the above, in the present invention, the GAP in the recording format described with reference to FIG. 1 is used. The GAP is an area for the purpose of managing zones, and is not related to recording/reproducing of actual data. Therefore, in the third embodiment, the process of accelerating the reading speed is carried out while the reading head is passing over the GAP.

Described below is the data reading in the third embodiment, mainly a difference from the first and second embodiments.

Figure 10:
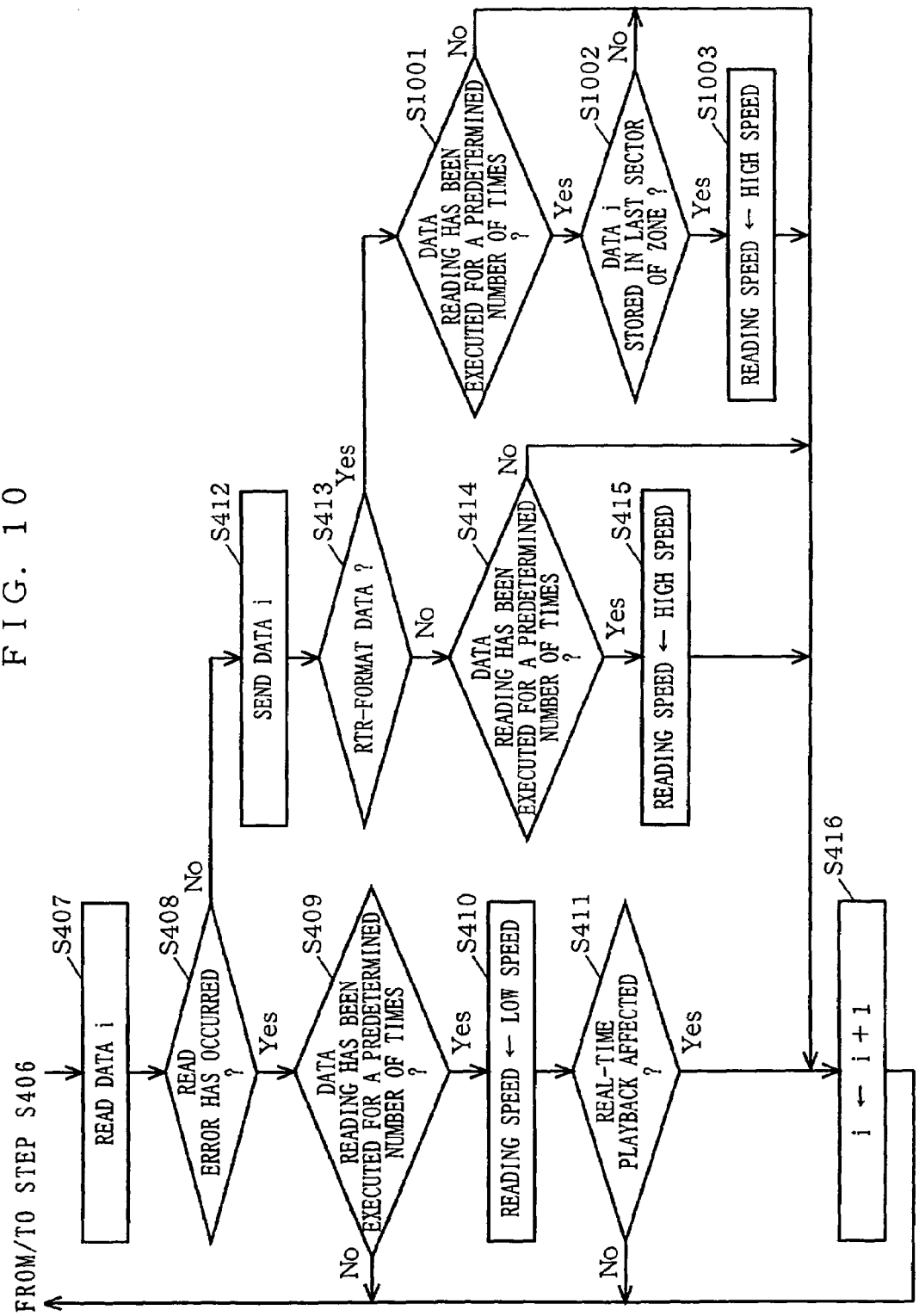
FIG. 10 is a flowchart showing a procedure of data reading according to a third embodiment of the present invention corresponding to FIG. 4.
Figure 11:
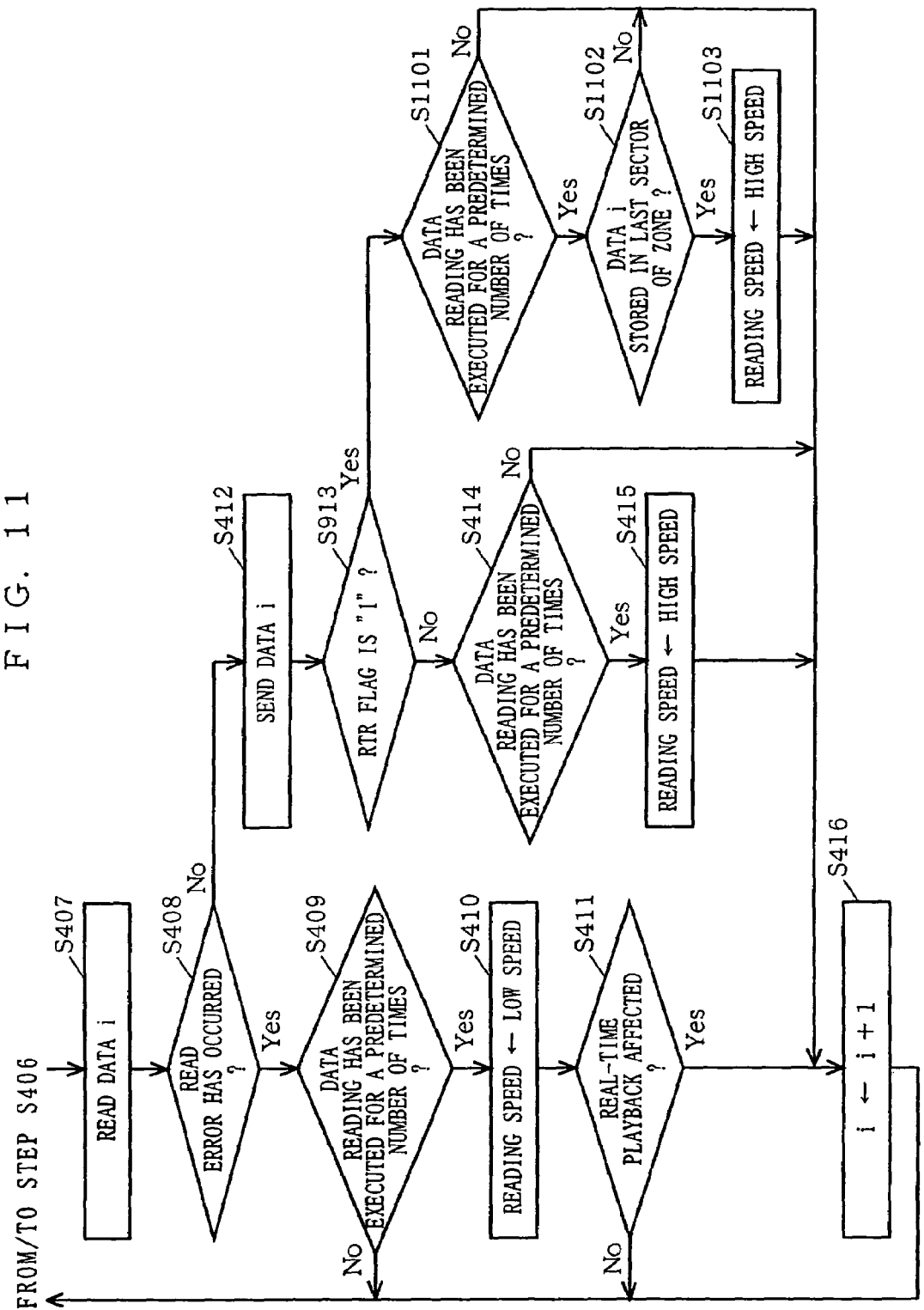
FIG. 11 is a flowchart showing another procedure of data reading according to the third embodiment of the present invention corresponding to FIG. 9.

FIG. 10 is a flowchart showing a procedure of data reading according to the third embodiment corresponding to the first embodiment (FIG. 4). FIG. 11 is a flowchart showing another procedure of data reading according to the third embodiment corresponding to the second embodiment (FIG. 9). In FIGS. 10 and 11, steps for carrying out the same processing as in FIGS. 4 and 9 are provided with the same step number.

In FIG. 10, the control section 20 determines based on the additional information read together with the data whether the read data is RTR-format data (step S413). If the read data is RTR-format data, the control section 20 determines whether the number of times of low-speed reading that has been continuously carried out after the occurrence of the previous read error exceeds a predetermined number of times (step S1001). If the number of times of low-speed reading exceeds the predetermined number of times, the control section 20 further determines, based on the address uniquely provided to each sector, whether the read data is the one stored in the last sector in the zone (step S1002). If it is determined that the read data is the one stored in the last sector, the control section 20 starts changing the data reading speed back to the high speed (step S1003). Determining whether the data in the last sector of the zone has been read can be an easy criteria for determining whether the reading head has come to the head position of the GAP.

In FIG. 11, the control section 70 checks the RTR flag managed by the flag managing section 75 (step S913). If the RTR flag is "1", the control section 70 determines whether the number of low-speed reading that has been continuously carried out after the occurrence of the previous read error exceeds a predetermined number of times (step S1101). If the number of low-speed reading exceeds the predetermined number of times, the control section 70 further determines whether the read data is the one stored in the last sector in the zone (step S1102). If the read data is the one stored in the last sector, the control section 70 starts changing the data reading speed back to the high speed (step S1103)

According to the third embodiment, the process of accelerating the data reading speed is carried out while the reading head is passing over the GAP. Thus, even if the reading speed for RTR-format data is once changed to the low speed, the reading speed can be changed back to the high speed without interfering with real-time reproduction.

Examples of standards for the RTR format are "DVD Specification for Rewritable Disc (DVD-RAM) Part 2, FILE SYSTEM SPECIFICATIONS Version 2.0" and "DVD Specifications for Re-recordable Disc (DVD-RW) Part 2, FILE SYSTEM SPECIFICATIONS Version 1.0". These specifications are written on the basis of using the UDF format. In the RTR format defined in these specifications, when RTR-format data is recorded on a disc, a directory "DVD_RTAV" is created in a predetermined sector area for UDF-format data management. Therefore, by checking the presence or absence of this directory, it is possible to determine whether the disc has RTR-format data recorded thereon. Note that details of a file format of the DVD-RAM disc and its related UDF format are described in detail in the above specifications.

Also, depending on RTR-format data, a copyright management scheme called CPRM (Content Protection for Recordable Media) may be used. In CPRM, an authentication procedure for protecting a copyright is taken when a disc is set. Therefore, by checking whether the authentic ation procedure has been completed, it is possible to determine whether the disc has RTR-format data recorded thereon.

If the disc drive device and the host section are interfaced with each other through well-known ATAPI (AT attachment packet interface), a READ12 command is used for instruction of data reading. This READ12 command includes a streaming bit indicating whether reading of RTR-format data is requested (FIG. 12).

By using the READ 12 command, the RTR-format data reading may be controlled in a manner similar to that in the second embodiment where the RTR flag is used. For example, when the disc drive device receives a READ12 command including the streaming bit indicative of "1", it is determined that real-time playback is requested. Thus, not the disc drive device but the host section can assume the main role of controlling RTR-format data reading.

If any interface other than ATAPI includes information equivalent to the streaming bit of the READ12 command in ATAPI, it is possible to control RTR-format data reading by using this information in a manner similar to that in the case of using the streaming bit.

Furthermore, in the first to third embodiments, disc drive devices capable of double-speed (high-speed) or single-speed (low-speed) playback have been described. The present invention can also be applied to disc drive devices capable of other speeds. Still further, the speed of reading the disc does not have to be equal for every disc. For example, DVD-RAM discs may be read at double or single speed, while DVD-ROM discs may be read at 16× or 8× speed. Still further, the present invention can be easily applied to a disc drive device supporting a plurality of speeds for playback. For example, for a disc drive device capable of playback at quadruple, double, or single speed, the deceleration process at the occurrence of an error occurs may be carried out stepwise, such as first at quadruple speed, double speed, and then single speed; or directly, such as first at quadruple speed and then directly to single speed. Moreover, the deceleration process to the single speed may be carried out only for RTR-format data. On the other hand, the acceleration process on RTR-format data after normal reading has been carried out for the predetermined number of times may be either a change from single speed to double speed or a change from double speed to quadruple speed, or may not be carried out at all. In the former case, two RTR flags are provided, the one for the change from single speed to double speed, and the other for the change from double speed to quadruple speed (in the second embodiment).

As such, by providing a plurality of RTR flags corresponding to the plurality of possible playback speeds, it is possible to carry out the acceleration process stepwise from a low speed to an optimal speed at which real-time playback is not interfered with.

While the invention has been described in detail, the foregoing description is in all aspects illustrative and not restrictive. It is understood that numerous other modifications and variations can be devised without departing from the scope of the invention.

What is claimed is:

1. A disc drive device supporting at least two reading speeds, a high speed and a low speed, capable of driving a disc, reading data from the disc by following a read instruction from a host section, and sending the read data to the host section, the disc drive device comprising:
   a processing section operable to read, from the disc at one of the reading speeds, the data corresponding to the read instruction, and additional information related to the data;
   a determining section operable to determine, based on the additional information, whether the read data is Real-time data;
   a storage section operable to temporarily store the read data; and
   a sending section operable to send the data stored in the storage section to the host section in predetermined playback timing, wherein
   when the reading speed is currently the low speed, the processing section keeps the reading speed while the determining section determines that the read data is Real-time data.

2. The disc drive device according to claim 1, wherein when the reading speed is currently the high speed, the processing section changes the reading speed to the low speed when the determining section determines, successively for a predetermined number of times, that the read data is the Real-time data.

3. The disc drive device according to claim 1, wherein when the reading speed is currently the high speed, the processing section changes the reading speed to the low speed when a data read error occurs.

4. The disc drive device according to claim 1, wherein when the reading speed is currently the high speed, the processing section changes the reading speed to the low speed after a data read error occurs and then a predetermined condition is satisfied.

5. The disc drive device according to claim 4, wherein the predetermined condition is whether data reading has been carried out for a predetermined number of times.

6. The disc drive device according to claim 4, wherein the predetermined condition is whether data reading has been carried out for a predetermined period.

7. The disc drive device according to claim 1, wherein when the reading speed is currently the low speed, the processing section changes the reading speed to the high speed when the determining section determines that the read data is not the Real-time data and when a predetermined condition is satisfied.

8. The disc drive device according to claim 7, wherein the predetermined condition is whether data reading has been successfully carried out for a predetermined number of times after a data read error was cleared.

9. The disc drive device according to claim 7, wherein the predetermined condition is whether data reading has been successfully carried out for a predetermined period after a data read error was cleared.

10. The disc drive device according to claim 1, wherein the disc includes data areas each including a plurality of zones and a gap provided between the zones, and when the reading speed is currently the low speed, the processing section changes, under a predetermined condition, the reading speed to the high speed while a reading head is passing through the gap, even though the determining section determines that the read data is the Real-time data.

11. The disc drive device according to claim 10, wherein the predetermined condition is whether data reading has been successfully carried out for a predetermined number of times after a data read error was cleared.

12. The disc drive device according to claim 10, wherein the predetermined condition is whether data reading has been successfully carried out for a predetermined period after a data read error was cleared.

13. The disc drive device according to claim 1, wherein the additional information is a recording type bit recorded on a header of a sector that stores the data.

14. A disc drive device supporting at least two reading speeds, a high speed and a low speed, capable of driving a disc, reading data from the disc by following a read instruction from a host section, and sending the read data to the host section, the disc drive device comprising:
   a determining section operable to determine whether the disc has Real-time data thereon based on specific information stored on the disc;
   a managing section operable to set a flag indicating whether the Real-time data exists based on a determination result from the determining section;
   a processing section operable to read, from the disc at one of the reading speeds, the data corresponding to the read instruction;
   a storage section operable to temporarily store the read data; and
   a sending section operable to send the data stored in the storage section to the host section in predetermined playback timing, wherein
   the managing section sets the flag when the determining section determines that the disc has the Real-time data thereon, and
   when the reading speed is currently the low speed, the processing section keeps the reading speed while the flag is set.

15. The disc drive device according to claim 14, wherein, when the reading speed is currently the high speed, the processing section changes the reading speed to the low speed when the determining section determines, successively for a predetermined number of times, that the read data is the Real-time data.

16. The disc drive device according to claim 14, wherein when the reading speed is currently the high speed, the processing section changes the reading speed to the low speed when a data read error occurs.

17. The disc drive device according to claim 14, wherein when the reading speed is currently the high speed, the processing section changes the reading speed to the low speed when a data read error occurs and then a predetermined condition is satisfied.

18. The disc drive device according to claim 17, wherein the predetermined condition is whether data reading has been carried out for a predetermined number of times.

19. The disc drive device according to claim 17, wherein the predetermined condition is whether data reading has been carried out for a predetermined period.

20. The disc drive device according to claim 14, wherein when the reading speed is currently the low speed, the processing section changes the reading speed to the high speed when the flag is not set and a predetermined condition is satisfied.

21. The disc drive device according to claim 20, wherein the predetermined condition is whether data reading has been successfully carried out for a predetermined number of times after a data read error was cleared.

22. The disc drive device according to claim 20, wherein the predetermined condition is whether data reading has been successfully carried out for a predetermined period after a data read error was cleared.

23. The disc drive device according to claim 14, wherein the disc includes data areas each including a plurality of zones and a gap provided between the zones, and when the reading speed is currently the low speed, the processing section changes, under a predetermined condition, the reading speed to the high speed while a reading head is passing through the gap, even though the flag is set.

24. The disc drive device according to claim 23, wherein the predetermined condition is whether data reading has been successfully carried out for a predetermined number of times after a data read error was cleared.

25. The disc drive device according to claim 23, wherein the predetermined condition is whether data reading has been successfully carried out for a predetermined period after a data read error was cleared.

26. The disc drive device according to claim 14, wherein the specific information is information representing whether an SLR bit recorded on a read-in area of the disc indicates 1.

27. The disc drive device according to claim 14, wherein the specific information is information representing whether a DVD_RTAV directory specified by the UDF format exists on the disc.

28. The disc drive device according to claim 14, wherein the managing section manages a plurality of flags according to the reading speeds, and individually sets the plurality of flags so that at least one of the reading speeds is not changed when the determining section determines that the disc has the Real-time data thereon.

29. A disc drive device supporting at least two reading speeds, a high speed and a low speed, capable of driving a disc, reading data from the disc by following a read instruction from a host section, and sending the read data to the host section, the disc drive device comprising:
an extracting section operable to extract, from the read instruction from the host section, information indicating whether real-time playback is to be carried out;
a processing section operable to read, based on the extracted information, from the disc at one of the reading speeds, the data corresponding to the read instruction;
a storage section operable to temporarily store the read data; and
a sending section operable to send the data stored in the storage section to the host section in predetermined playback timing, wherein
when the reading speed is currently the low speed, the processing section keeps the reading speed while the information indicates that the real-time playback is to be carried out.

30. The disc drive device according to claim 29, wherein when the reading speed is currently the high speed, the processing section changes the reading speed to the low speed when the information indicating that the real-time playback is to be carried out is extracted successively for a predetermined number of times.

31. The disc drive device according to claim 29, wherein when the reading speed is currently the high speed, the processing section changes the reading speed to the low speed when a data read error occurs.

32. The disc drive device according to claim 29, wherein when the reading speed is currently the high speed, the processing section changes the reading speed to the low speed when a data read error occurs and then a predetermined condition is satisfied.

33. The disc drive device according to claim 32, wherein the predetermined condition is whether data reading has been carried out for a predetermined number of times.

34. The disc drive device according to claim 32, wherein the predetermined condition is whether data reading has been carried our for a predetermined period.

35. The disc drive device according to claim 29, wherein when the reading speed is currently the low speed, the processing section changes the reading speed to the high speed when the information does not indicate that the real-time playback is to be carried out and a predetermined condition is satisfied.

36. The disc drive device according to claim 35, wherein the predetermined condition is whether data reading has been successfully carried out for a predetermined number of times after a data read error was cleared.

37. The disc drive device according to claim 35, wherein the predetermined condition is whether data reading has been successfully carried out for a predetermined period after a data read error was cleared.

38. The disc drive device according to claim 29, wherein the disc includes data areas each including a plurality of zones and a gap provided between the zones, and when the reading speed is currently the low speed, the processing section changes, under a predetermined condition, the reading speed to the high speed while a reading head is passing through the gap, even though the information indicates that the real-time playback is to be carried out.

39. The disc drive device according to claim 38, wherein the predetermined condition is whether data reading has been successfully carried out for a predetermined number of times after a data read error was cleared.

40. The disc drive device according to claim 38, wherein the predetermined condition is whether data reading has been successfully carried out for a predetermined period after a data read error was cleared.

41. The disc drive device according to claim 29, wherein when an interface to the host section is ATAPI, a streaming bit of a read command is used as the information indicating whether the real-time playback is to be carried out.

* * * * *